(12) United States Patent
Marti et al.

(10) Patent No.: US 9,307,358 B2
(45) Date of Patent: Apr. 5, 2016

(54) NON-INTRUSIVE REGION NOTIFICATION

(71) Applicant: Apple Inc., Cupertino, CA (US)

(72) Inventors: Lukas M. Marti, Santa Clara, CA (US); Pejman Lotfali Kazemi, Sunnyvale, CA (US); Robert Mayor, Half Moon Bay, CA (US); Shannon M. Ma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 237 days.

(21) Appl. No.: 13/913,492

(22) Filed: Jun. 9, 2013

(65) Prior Publication Data

US 2014/0364103 A1 Dec. 11, 2014

(51) Int. Cl.
*H04W 8/22* (2009.01)
*H04W 4/02* (2009.01)
*H04L 29/08* (2006.01)
*G06F 1/32* (2006.01)
*H04M 19/04* (2006.01)
*H04W 4/20* (2009.01)

(52) U.S. Cl.
CPC .............. *H04W 4/021* (2013.01); *G06F 1/3203* (2013.01); *H04L 67/18* (2013.01); *H04L 67/22* (2013.01); *H04L 67/32* (2013.01); *H04M 19/04* (2013.01); *H04W 4/02* (2013.01); *H04W 8/22* (2013.01); *H04W 4/206* (2013.01); *Y02B 60/46* (2013.01)

(58) Field of Classification Search
CPC ...................................................... H04W 4/021
See application file for complete search history.

(56) References Cited

U.S. PATENT DOCUMENTS 8,423,092 B2   4/2013  Caskey
2006/0270421 A1*  11/2006  Phillips et al. ................. 455/457
2009/0225230 A1    9/2009  Arroyo et al.
2011/0153525 A1    6/2011  Benco et al.
2011/0250901 A1*  10/2011  Grainger et al. ........... 455/456.1
2012/0177010 A1*   7/2012  Huang et al. .................. 370/335
2012/0180092 A1    7/2012  Wong
2012/0272230 A1   10/2012  Lee
2012/0309413 A1*  12/2012  Grosman et al. ........... 455/456.1
2013/0093627 A1*   4/2013  Cosman ........................ 342/451
2013/0122804 A1    5/2013  Narendra
2014/0141795 A1*   5/2014  Abraham et al. .......... 455/456.1

FOREIGN PATENT DOCUMENTS

WO    2004/003703    1/2004

OTHER PUBLICATIONS

International Search Report and Written Opinion of the International Searching Authority, PCT Application U.S. Appl. No. PCT/US2014/040046, Aug. 27, 2014, 9 pp.

* cited by examiner

*Primary Examiner* — Mazda Sabouri
(74) *Attorney, Agent, or Firm* — Fish & Richardson P.C.

(57) ABSTRACT

Techniques of non-intrusive region notification are described. A mobile device can be programmed to trigger an application program when the mobile device enters or exits a region. The region can be defined by various virtual fencing technologies. If, at the time of entry or exit of a region, the mobile device is in a power-saving operating mode, the mobile device can transition to an active operating mode temporarily, register a fence-crossing event (entry or exit of the region) with the application program, and then transition back to the power-saving operating mode. The mobile device can launch the registered application program in response to the mobile device receiving a user input to enter the active operating mode. The application program can provide a user interface associated with the region on a display surface of the mobile device in place of a home screen or other user interface.

30 Claims, 7 Drawing Sheets

NON-INTRUSIVE REGION NOTIFICATION

TECHNICAL FIELD

This disclosure relates generally to geofencing.

BACKGROUND

Some mobile devices have features for providing location-based services. For example, a mobile device can execute a pre-specified application program or present certain content when the mobile device enters or exits a geofence. The geofence can be defined by a point location and a radius. The point location can have a longitude coordinate and a latitude coordinate. The mobile device can determine that the mobile device has entered the geofence or exited the geofence by determining an estimated location of the mobile device and calculating a distance between the estimated location and the point location. Based on whether the calculated distance exceeds the radius of the geofence, the mobile device can determine whether the mobile device entered or exited the geofence. The mobile device can then launch an application associated with the geofence. For example, the mobile device can display a reminder associated with a geofence around a location designated as "office" when the mobile device enters or leaves the "office" location.

SUMMARY

Techniques of non-intrusive region notification are described. A mobile device can be programmed to trigger an application program when the mobile device enters or exits a region. The region can be defined by various virtual fencing technologies. If, at the time of entry or exit of a region, the mobile device is in a power-saving operating mode, the mobile device can transition to an active operating mode temporarily, register a fence-crossing event (entry or exit of the region) with the application program, and then transition back to the power-saving operating mode. The mobile device can launch the registered application program in response to the mobile device receiving a user input to enter the active operating mode. The application program can provide a user interface associated with the region on a display surface of the mobile device in place of a home screen or other user interface.

The features described in this specification can be implemented to achieve one or more advantages. Compared to conventional geofencing techniques, the features described in this specification can avoid intrusive message displays that may be considered annoying by a user. A user carrying a mobile device can move across multiple virtual fences. Instead of launching an application program, which may contain advertisements, when the mobile device crosses each virtual fence, the mobile device can register the entry or exit transparently, and launch the application program only when a user indicates interest in content associated with that particular fence. Intrusive activation of a display of the mobile device to show an advertisement or other information can be reduced or avoided.

Compared to conventional geofencing techniques, the features described in this specification can make a mobile device more power-efficient. User notification occurs when a display surface is activated. Accordingly, when a fence-crossing event occurs, the mobile device, if in a power-saving operating mode, can register the fence-crossing event in a short period of activation, and then go back to the power-saving operating mode. The period of activation can be minimized to keep the mobile device in the power-saving operating mode as long as possible to conserve power.

The features described in this specification can encourage businesses who maintain a virtual fence to provide more information of their products or services to consumers. Using conventional geofencing techniques, a business having a virtual fence can be reluctant to provide even useful information for display to a consumer, knowing that an accidental trigger of display of the information to a passer-by may be considered as intrusive. The techniques described in this specification can reduce the intrusive displays, and only display the information when a user of the mobile device appears lingering around a product and appears ready to perform some research on the product. Accordingly, the business can be more confident that people viewing the content are actually interested in the content.

The details of one or more implementations of non-intrusive region notification are set forth in the accompanying drawings and the description below. Other features, aspects, and advantages of non-intrusive region notification will become apparent from the description, the drawings, and the claims.

BRIEF DESCRIPTION OF THE DRAWINGS

Like reference symbols in the various drawings indicate like elements.

DETAILED DESCRIPTION

Exemplary Non-Intrusive Region Notification

Figure 1:
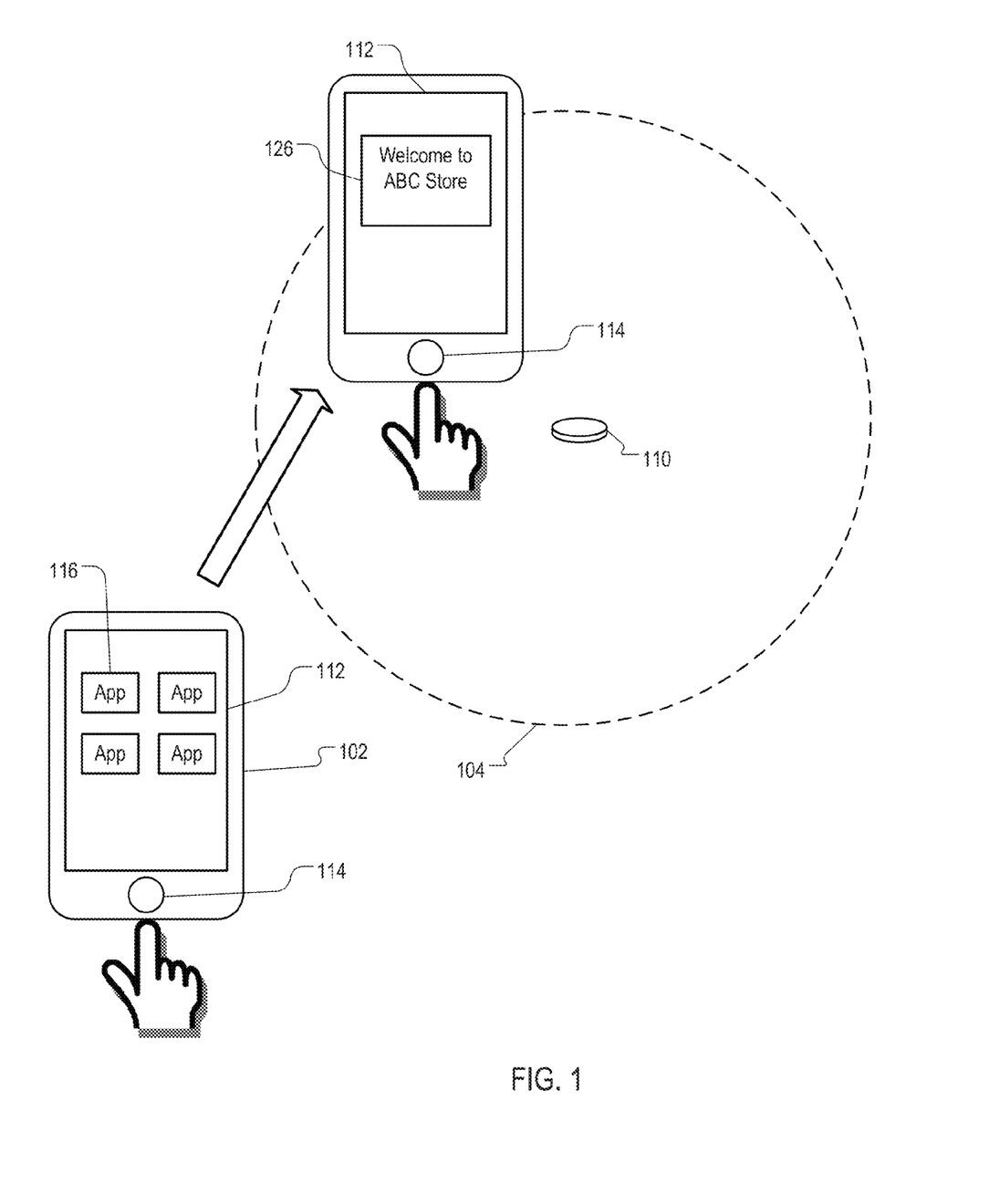
FIG. 1 is a diagram illustrating exemplary non-intrusive region notification.

FIG. 1 is a diagram illustrating exemplary non-intrusive region notification. Mobile device 102 can be an electronic device programmed to execute an application program when mobile device 102 enters region 104. Region 104 can be a geographic region defined by a virtual fence, e.g., a conventional geofence or a proximity fence. A proximity fence can be a location-agnostic virtual fence defined by signal source 110 having no geographic location information (e.g., a point location fixed to latitude and longitude coordinates). Signal source 110 can be a radio frequency (RF) transmitter broadcasting a beacon signal. The beacon signal can include a payload that includes an identifier of signal source 110. The identifier can be associated with an application program of mobile device 102. The application program, when executed, can display information related to region 104 on display surface 112. An fence-crossing event (e.g., entry or exit) at region 104 by mobile device 102 can trigger the launching of an application program or performance of a function of an executing application program.

Mobile device 102 can be programmed to trigger the launching of application program in a non-intrusive manner. Mobile device 102 can launch the application program when mobile device 102 is already in an active operating mode. When mobile device 102 is in the active operating mode, display surface 112 is activated and unlocked. If mobile device 102 is in a power-saving operating mode, e.g., when display surface 112 of mobile device 102 is inactive or is locked, mobile device 102 can register the application program for launch later, instead of launching the application program immediately.

For example, when mobile device 102 is outside of region 104, mobile device 102 can be in power-saving operating mode, until mobile device 102 receives an input to activate. The input can be a user input, for example, a user pressing home button 114 of mobile device 102. Upon receiving the input, mobile device 102 can perform a search in a registry to determine if mobile device 102 is in any region associated with an application program. The registry can be stored locally on mobile device 102 or remotely on a server. When no such region is found, mobile device 102 can display a home screen on display surface 112. The home screen can be a default user interface configured by a user or by mobile device 102 to display on display surface 112 when mobile device 102 is activated from a power-saving operating mode. The home screen can include one or more icons 116 representing application programs.

Mobile device 102 can cross the virtual fence defined by signal source 110 and move into region 104. When mobile device 102 is already in an active operating mode when mobile device 102 detects a fence-crossing event, mobile device 102 can execute the application program and display the information related to region 104. If mobile device 102 is in a power-saving operating mode when mobile device 102 detects a fence-crossing event, mobile device can register the fence-crossing event by storing an identifier of region 104 associated with the application program in a database. The identifier can be a universally unique identifier (UUID) associated with signal source 110. Next, when mobile device 102 receives a user input for activation, mobile device 102 can search the database and find the identifier. Based on the identifier, mobile device 102 can determine the application program. Mobile device can then launch the application program, and display information 126 on display surface 112.

Figure 2:
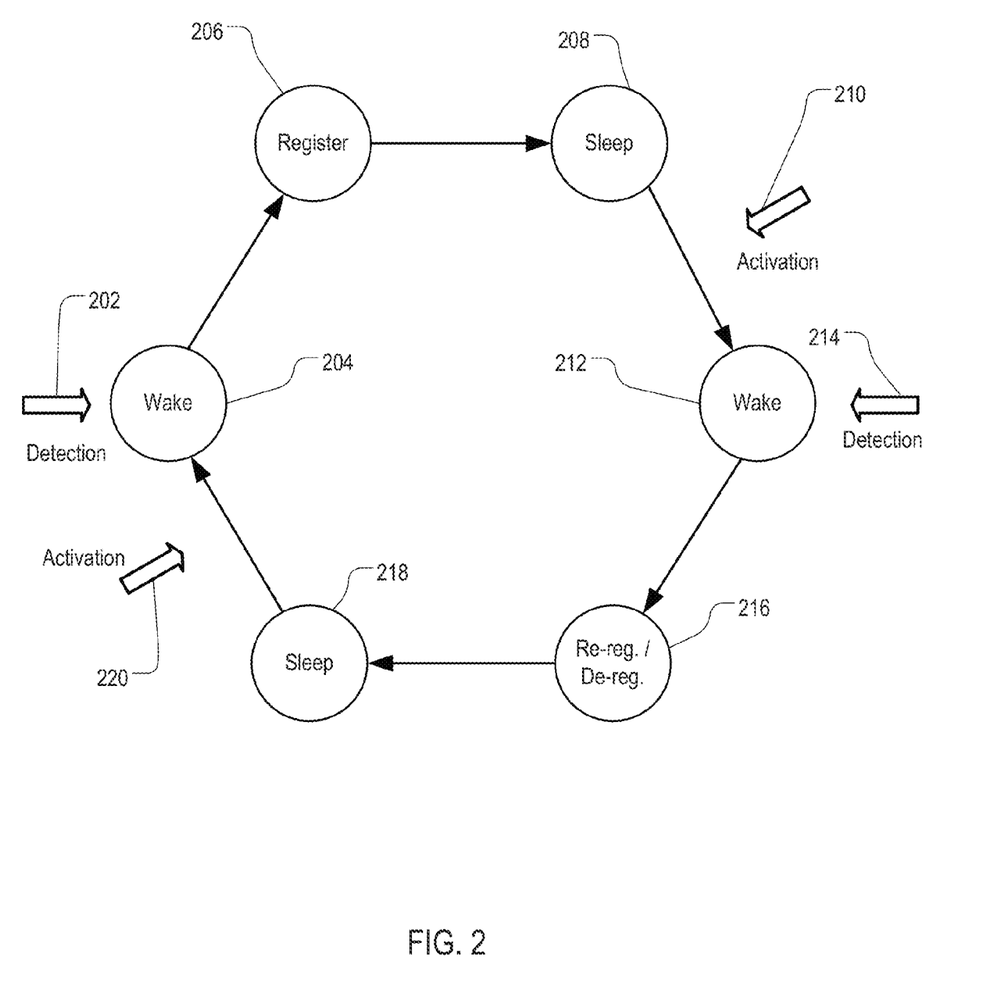
FIG. 2 is a diagram illustrating transitions between operating modes of an exemplary mobile device implementing non-intrusive region notification.

FIG. 2 is a diagram illustrating transitions between operating modes of exemplary mobile device 102 implementing non-intrusive region notification. Initially, mobile device 102 can be in a power-saving operating mode. In the power-saving operating mode, one or more processors of mobile device 102 can be powered off, or be configured to operate at reduced clock cycle to conserve battery power. A display surface, e.g., a touch-sensitive screen, of mobile device 102 can be locked or turned off. When locked or turned off, the display surface can be irresponsive to a touch input. In the power-saving operating mode, a wireless processor of mobile device 102 used for scanning for wireless signals may continue to operate, including continue to scan for wireless signals from wireless transmitters, e.g., cellular towers, wireless access points, or low energy beacon devices.

When the wireless processor of mobile device 102 detects (202) a signal from a wireless transmitter that contains an identifier pre-registered at the wireless processor, indicating that mobile device 102 has entered a fenced region, the wireless processor can wake (204) mobile device 102 into an active operating mode. Waking mobile device 102 into an active operating mode can include activating the powered off processors and operating the processors at normal clock cycle. After being awakened, mobile device 102 can operate at active (full-powered) operating mode.

Mobile device 102 can be awakened by various events. Once awakened, mobile device 102 can stay in the active operating mode until a pre-set time (e.g., X minutes) has passed since a last user action is performed on mobile device 102. When mobile device 102 implements non-intrusive region notification, detection 202 can cause mobile device 102 to activate and stay in the active operating mode for a brief duration (e.g., less than a second) that is imperceptible by a user. During active operating mode, mobile device 102 need not activate a display surface. Mobile device 102 can register (206) the fenced region during active operating mode. Registering the region can include storing a signal source identifier detected in a wireless signal received by mobile device 102 on a storage device. The time period can be pre-programmed to be sufficiently long to permit completion of the registration operations. Alternatively, the time period can be specified to last until a signal indicates completion of the registration operations. After the time period ends, mobile device 102 can sleep (208), transitioning from the active operating mode back to the power-saving operating mode.

During power-saving operating mode, mobile device 102 can receive activation request 210. Activation request 210 can be an event of a user pressing a home button as described above in reference to FIG. 1. Additionally, activation request 210 can be any other event that cause mobile device 102 to activate a display surface. For example, the event can be a headphone or microphone being plugged into mobile device 102, an alarm event where an internal clock of mobile device 102 triggers a display surface to display an alert message, a speaker to play an alert sound, a mechanical unit to generate a vibration, or a reminder event where a reminder program triggers a message to be displayed. Upon receiving activation request 210, mobile device 102 can transition from the power-saving operating mode to the active operating mode.

Upon the transition, mobile device 102 can examine the registry and determine whether mobile device 102 entered a fenced region. If mobile device 102 determines that an identifier is stored in the registry, and the identifier is associated with an application program, mobile device 102 can execute the application program. The application program can cause mobile device 102 to display a message in place of a default home screen, or play a sound.

In some implementations, mobile device 102 can prioritize the execution of the application program during registration. For example, mobile device 102 can designate the execution as medium priority. Upon such designation, mobile device 102 can perform high priority tasks (e.g., displaying the alert message or playing the alert sound) before executing the application program. Mobile device 102 can perform low priority tasks (e.g., displaying the home screen) after executing the application program.

If mobile device 102 does not receive activation request 210, mobile device 102 may stay in power-saving operating mode until mobile device 102 wakes (212) in response to a second detection 214 by the wireless processor of mobile device 102, and transitions from the power-saving operating mode to the active operating mode. The second detection 214 can be a detection of an exit of the fenced region that mobile device 102 previously entered. The second detection can be a detection that mobile device 102 entered another fenced region. The second detection 214 can cause mobile device 102 to stay in the active operating mode for a brief time period sufficient for modifying the registry.

During this time period, mobile device 102 can modify (216) the registry, currently storing an identifier corresponding to a last region mobile device 102 entered. Mobile device 102 can de-register by clearing the registry (e.g., by removing the existing identifier from the registry), if the second detection 214 indicates that mobile device exited the region without entering a new registered region. Alternatively, mobile device 102 can re-register by storing a new identifier in the registry (e.g., by replacing the registered identifier with the new identifier). When mobile device 102 finishes modifying the registry during the time period, mobile device 102 can sleep (218), transitioning back to the power-saving operating mode.

During power-saving operating mode, mobile device 102 can receive activation request 220. Mobile device 102 can provide a response to activation request 220 based on content of registry. If the registry has been cleared during modification 216, mobile device 102 can transition into active operating mode. If the registry stores a new identifier associated with a new application program, mobile device 102 can execute the new application program as described above in reference to activation request 210. If mobile device 102 does not receive activation request 220, or after being activated transitions back to power-saving operating mode due to inactivity, mobile device 102 may wake up (204) in response to a next detection of an entry into a fenced region.

Figure 3:
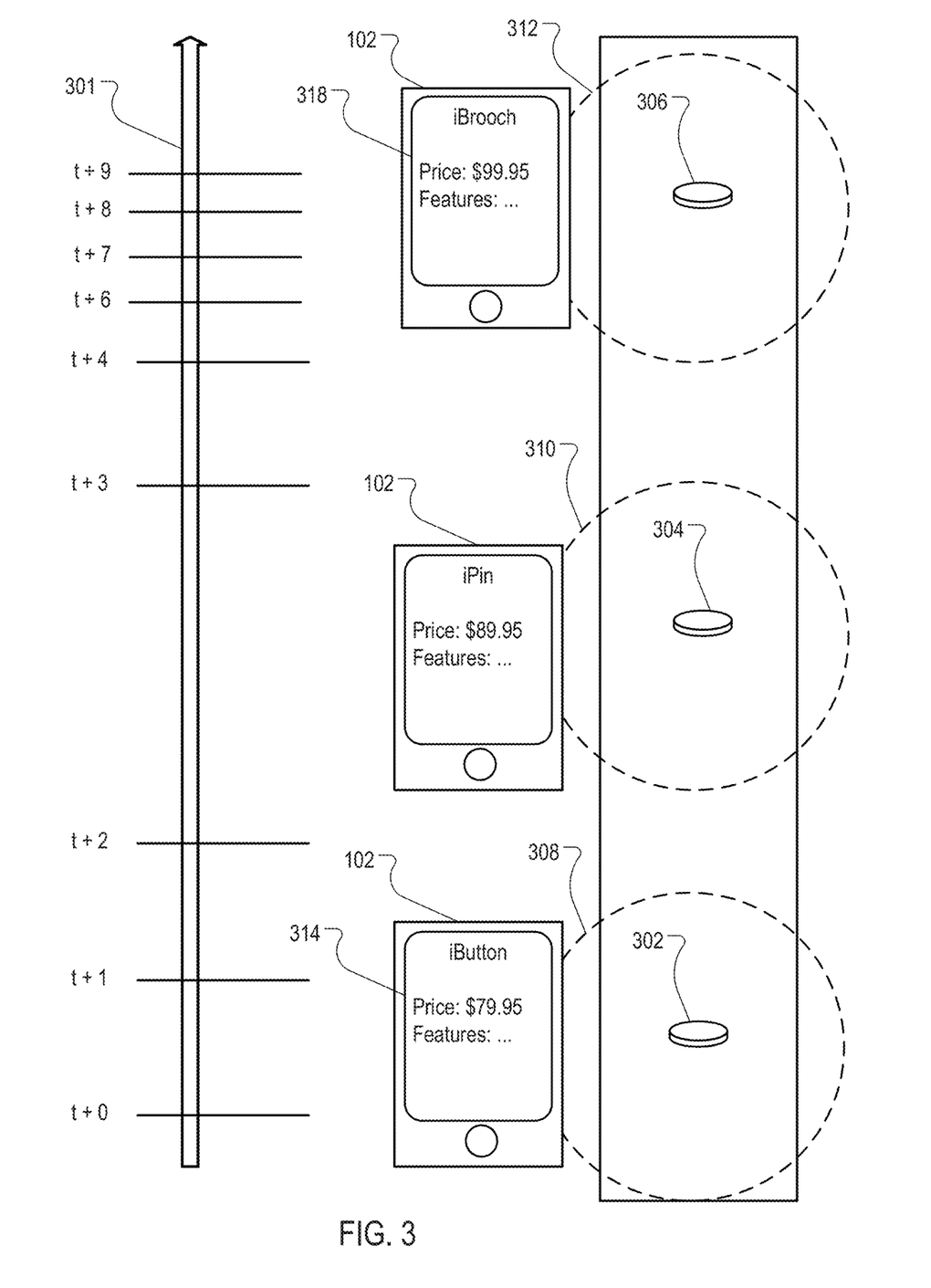
FIG. 3 is a diagram illustrating non-intrusive region notification when an exemplary mobile device crosses multiple fences in succession.

FIG. 3 is a diagram illustrating non-intrusive region notification when exemplary mobile device 102 crosses multiple fences in succession. Mobile device 102 can move along path 301. Path 301 can cross multiple virtual fences defined by signal sources 302, 304, and 306, respectively. Each of signal sources 302, 304, and 306 can be a wireless beacon configured to broadcast an information snippet. In some implementations, signal sources 302, 304, and 306 are radio frequency (RF) transmitters. In some implementations, signal sources 302, 304, and 306 can be Institute of Electrical and Electronics Engineers (IEEE) 802.11u compliant Wi-Fi™ beacons. In some implementations, signal sources 302, 304, and 306 can be Bluetooth™ low energy (BTLE) or near field communication (NFC) beacons. Signal sources 302, 304, and 306 can have a same device type or different device types. Each of signal sources 302, 304, and 306 can broadcast a beacon signal through one or more specified channels. Each of signal sources 302, 304, and 306 can correspond to a communication range in which the respective beacon signal is detectable by mobile devices (e.g., mobile device 102). Each communication range can correspond to a virtual fence surrounding a region. Regions 308, 310, and 312 can correspond to signal sources 302, 304, and 306, respectively.

When mobile device 102 moves along path 301, mobile device 102 can successively enter and exit regions 308, 310, and 312. Each time mobile device 102 enters a region, mobile device 102 can detect a region entry. Each time mobile device 102 exits a region, mobile device 102 can detect a region exit.

For example, mobile device 102 can detect an entry into region 308 when a wireless processor of mobile device 102 detects a signal from signal source 302 and, in some implementations, when the wireless processor of mobile device 102 detects the signal and determines that signal strength (e.g., a received signal strength indicator or RSSI) satisfies a threshold value (e.g., X dB). When mobile device 102 detects signal source 302, mobile device 102 can trigger the launch of an application program associated with signal source 302 by registering an identifier associated with the application program. Registration of the identifier allows mobile device 102 to display content 314 in a non-intrusive manner, e.g., only when mobile device 102 is already activated or upon mobile device 102 being activated.

Mobile device 102 can detect an exit from region 308 when the wireless processor of mobile device 102 fails to detect a signal from signal source 302 or when the RSSI of the signal falls below the threshold value in one or more scans of wireless communication channels. The wireless processor can initiate a scan periodically (e.g., every X minutes), upon an activation of the wireless processor (by a user or programmatically), or when mobile device 102 wakes (e.g., being activated by a user or programmatically). Upon detecting an exit, mobile device 102 can de-register the identifier, such that when mobile device 102 is activated, mobile device 102 no longer displays content 314.

In some implementations, the wireless processor can be programmed to scan channels continuously when a given condition is satisfied. The condition can be specified by an application program that requires immediate notification on a fence exit. For example, mobile device 102 can move quickly through region 310 defined by signal source 304, as indicated by a time interval (between time t+2 and time t+3) in which mobile device 102 is in region 310 is approximately half as long as the time interval (between t+0 and t+2) in which mobile device 102 is in region 308. Here, t represents an initial time, whereas t+n is the initial time plus n time units (e.g., seconds or minutes). Mobile device 102 can cause the wireless processor to scan channels continuously to accommodate the relatively fast movement of mobile device 102 in region 310. The continuous scan can be triggered by a motion sensor of mobile device 102 indicating mobile device 102 is moving fast, or by an indicator associated with an identifier of signal source 304, which historically has seen fast movements of mobile devices around signal source 304. Using the continuous scan, mobile device 102 can immediately de-register the identifier of signal source 304 when mobile device 102 leaves region 310.

In some implementations, a longer stay in a region can raise the priority of an application program associated with a region. For example, mobile device 102 can stay in region 312 for a time interval between t+4 and t+9. During this time interval, mobile device 102 can receive multiple indications from the wireless processor that the wireless processor detects signal source 306, indicating that mobile device 102 has stayed in region 312 for a duration that satisfies a dwell threshold. In response, mobile device 102 can raise the priority of the application program associated with signal source 306, such that, when mobile device 102 is activated, content 318, as provided by the application program, is displayed before another program (e.g., a reminder) that otherwise will have higher priority.

Exemplary Device Components

Figure 4:
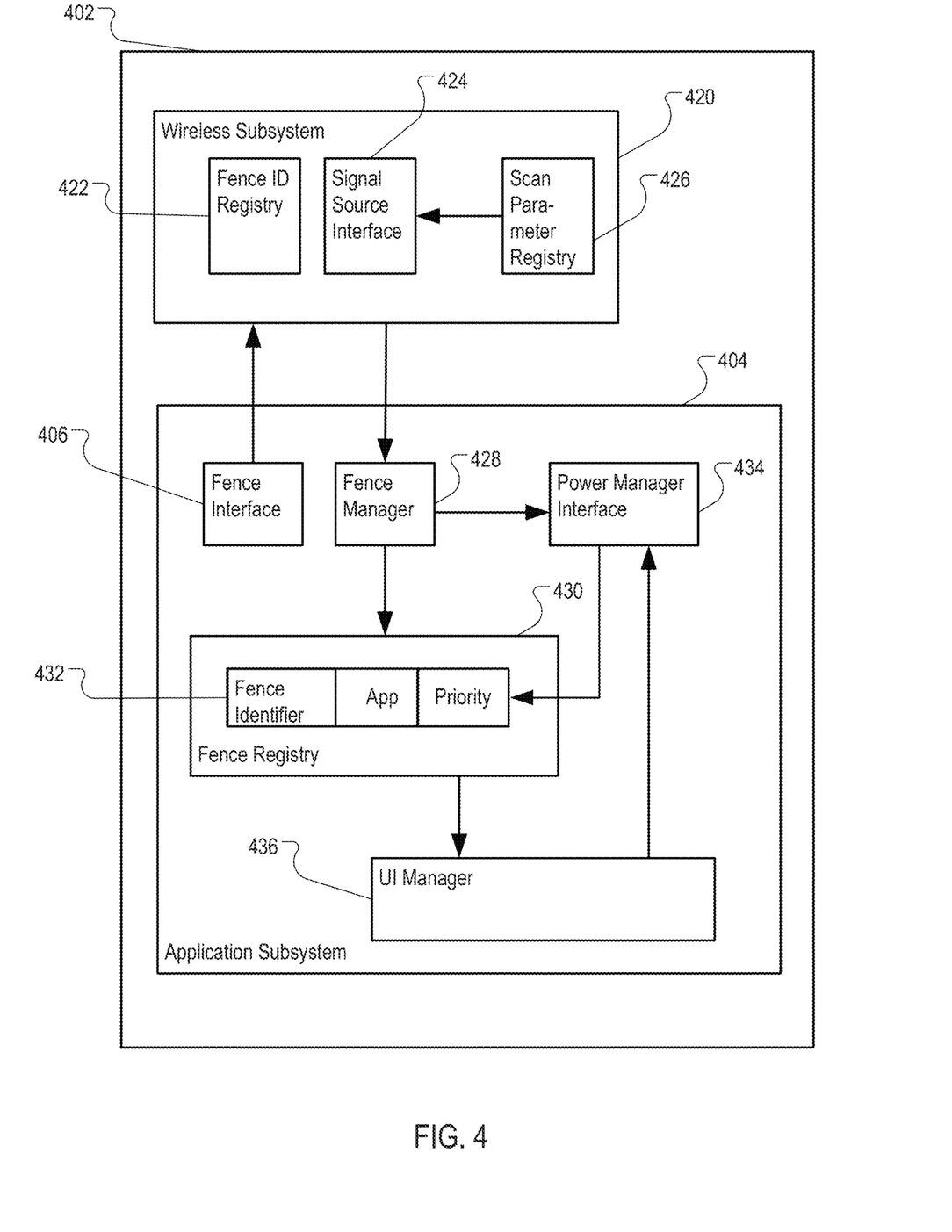
FIG. 4 is a block diagram illustrating components of an exemplary non-intrusive region notification subsystem of a mobile device.

FIG. 4 is a block diagram illustrating components of exemplary non-intrusive region notification subsystem 402 of mobile device 102. Subsystem 402 can include application subsystem 404. Application subsystem 404 can include one or more processors (e.g., application processors) configured to execute an application program. Application subsystem 404 can include fence interface 406. Fence interface 406 is a component of application subsystem 404 configured to communicate with an application manager and receive one or more application programs from the application manger. The application manager can be a server of a business managing virtual fences and application programs. Receiving the application programs can include downloading the application programs. Each application program received by fence interface 406 can be associated with an identifier of a group of one or more signal sources. The identifier can be a universally unique identifier (UUID). Fence interface 406 can store the application program on a storage device, and register the identifier at with wireless subsystem 420.

Wireless subsystem 420 is a component of subsystem 402 that includes an antenna, a wireless processor (e.g., a baseband processor, Wi-Fi™ processor, or Bluetooth™ processor), and software or firmware that causes the wireless processor to perform operations of scan and notification. Wireless subsystem 420 can include fence identifier registry 422. Fence identifier registry 422 can store one or more signal source identifiers for scanning. Each signal source identifier can be a fence identifier identifying a virtual fence and the region enclosed by the virtual fence. Wireless subsystem 420 can include signal source interface 424. Signal source interface 424 is a component of wireless subsystem 420 including hardware and software configured to scan one or more communication channels for signals (e.g., beacon signals) from signal sources, to detect signal source identifiers from the scans, and to match the detected signal source identifiers with the fence identifiers stored in fence identifier registry 422. Wireless subsystem 420 can include scan parameter registry 426 configured to store an entry threshold (M), an exit threshold (N), or both. Signal source interface 424 can generate a notification when a signal source identifier matching one of the fence identifiers is detected in at least M scans, or is undetected in at least N scans. The notification can include the matching fence identifier.

Wireless subsystem 420 can provide the notification to application subsystem 404. The notification can include one or more fence identifiers for which a match is detected. Fence manager 428 of application subsystem 404 can receive the notification and determine the fence identifier from the notification. Fence manager 428 can store the identifier in fence registry 430. Fence registry 430 can be a storage device of application subsystem 404 configured to store fence item 432 that includes the fence identifier and either the application program associated with the virtual fence or a reference to the application program.

Fence manager 428, upon receiving the notification, can inform power manager interface 434 that a fence identifier is being registered or has been registered in fence registry 430. Power manager interface 434 is a component of application subsystem 404 configured to communicate with a power manager of mobile device 102 and, if a fence identifier is stored in fence registry 430, causes application subsystem 404 to execute the associated application upon an activation event (e.g., a power up event received from the power manager). In some implementations, fence item 432 can include a priority of the application program. An order of executing the application program, including whether to launch the application program before, while, or after another program can be determined based on the priority. Upon execution of the application program, power manager interface 434 can delete fence item 432 from fence registry 430.

Application subsystem 404 can include user interface manager 436. User interface manager 436 is a component of application subsystem 404 configured to receive a user input for activating mobile device 102 (e.g., by pressing a home button or making a gesture across a touch-sensitive surface of mobile device 102 to unlock the surface). In addition, user interface manager 436 can be configured to present content provided by the application program to the user. Presenting the content can include providing the content for display on a display surface (e.g., a display screen) or for play on an audio subsystem.

Exemplary Procedures

Figure 5:
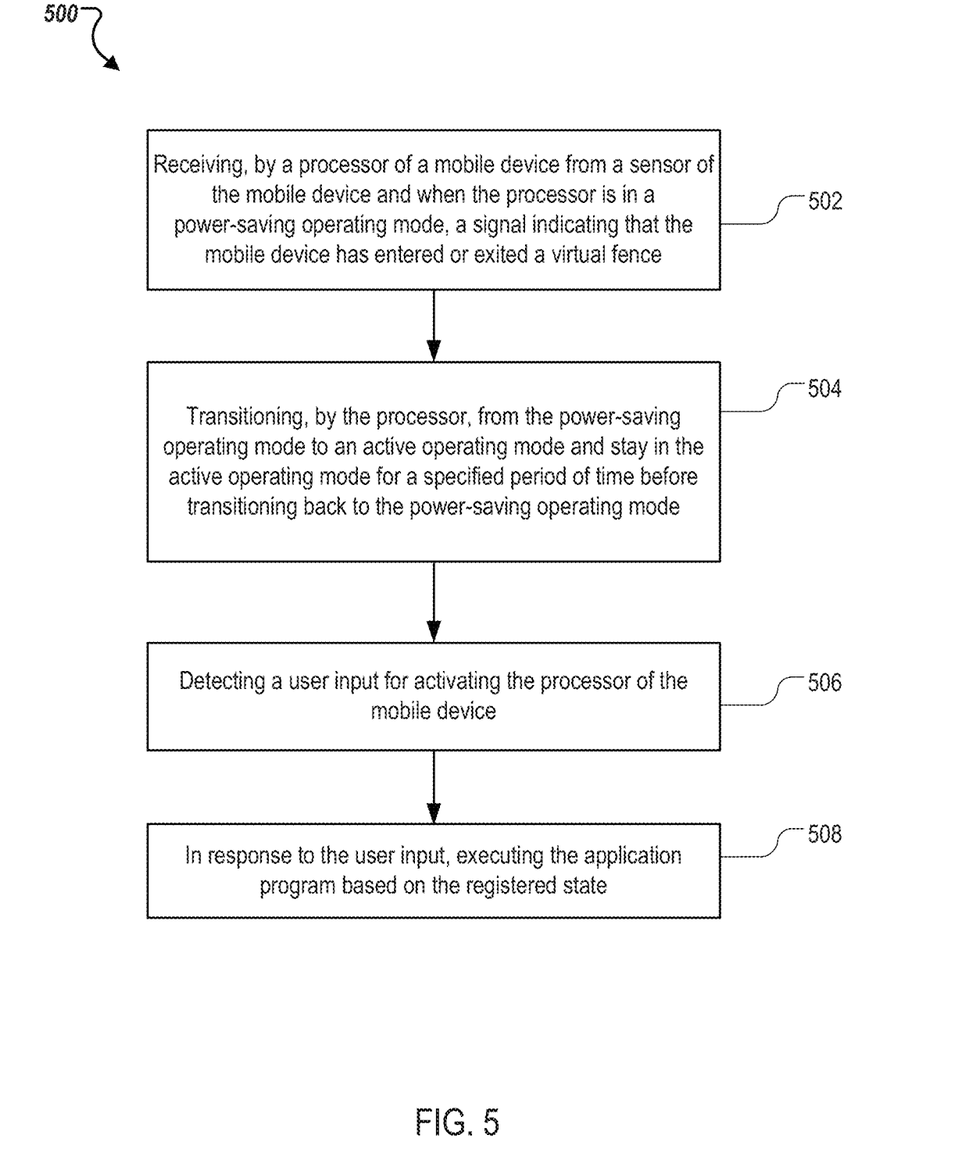
FIG. 5 is a flowchart of an exemplary procedure of non-intrusive region notification.

FIG. 5 is a flowchart of exemplary procedure 500 of non-intrusive region notification. Procedure 500 can be performed by mobile device 102.

Mobile device 102 can receive (502), by a processor of mobile device 102 and from a sensor of mobile device 102, a signal indicating that mobile device 102 has entered or exited a virtual fence. The processor can receive the signal when the processor is in a power-saving operating mode. The virtual fence can be associated with an application program configured to be executed upon an entry or an exit of the virtual fence. The virtual fence can be a geofence associated with a location defined by longitude, latitude, and altitude coordinates. The virtual fence can be a proximity fence associated with one or more signal sources. The proximity fence can be defined by a label broadcast in beacons of the signal sources. The label can include an identifier of each of the one or more signal sources. Each signal source can be a wireless access point of a wireless local area network (WLAN) or a signal source of a personal area network (PAN). For example, a signal source can be a Bluetooth™ Low Energy (BTLE) beacon.

The sensor of mobile device 102 can include a wireless processor, e.g., a radio frequency (RF) receiver configured to detect an RF signal. The RF signal can include an identifier of a signal source. The identifier can be pre-registered at the wireless processor. When mobile device 102 finds a match between an identifier in an RF signal detected by the wireless processor and a pre-registered identifier, mobile device 102 can determine that mobile device 102 entered or exited the virtual fence associated with the identifier.

The signal from the sensor can include a notification that mobile device 102 entered or exited the virtual fence. In some implementations, if the sensor includes a notification that mobile device 102 entered the virtual fence, mobile device 102 can cause the sensor to continue scanning communication channels until the sensor detects an exit of the virtual fence or the sensor detects an entry into another virtual fence.

Mobile device 102 can cause the processor to transition (504) from the power-saving operating mode to an active operating mode and stay in the active operating mode for a specified period of time before transitioning back to the power-saving operating mode. During the time the processor is in the active operating mode, the processor can register an event based on the received signal. The event can be the entry or exit of the virtual fence. The specified period of time can correspond to a time the processor takes to register the event. Registering the event can include storing the event on a storage device until the process receives a next signal or until the processor executes the application program.

Mobile device 102 can detect (506) an input activating the processor of mobile device 102. The input can be a user input. Detecting the input can include detecting a user action on a home button of mobile device 102. The home button can be a physical button on a front side of mobile device 102 configured to cause a display surface of mobile device 102 to show a home screen or a login screen. Detecting the input can include detecting a user gesture on a touch-sensitive display surface of mobile device 102.

Mobile device 102 can execute (508) the application program based on the registered event. In some implementations, mobile device 102 can activate a display surface (e.g., a touch-sensitive screen) of mobile device 102 and provide information related to the virtual fence for display on the display surface based on the event in a user interface of the application program. For example, the application program can be configured to display price and features of a product located within a region defined by a BTLE beacon. When mobile device 102 hovers over the product, mobile device 102, detecting a signal from the BTLE beacon, can display the price and features of the product, if a user presses the home button or unlocks the screen. The user interface for displaying the price and features can replace a home screen, which can be displayed in response to pressing the home button.

Exemplary Mobile Device Architecture

Figure 6:
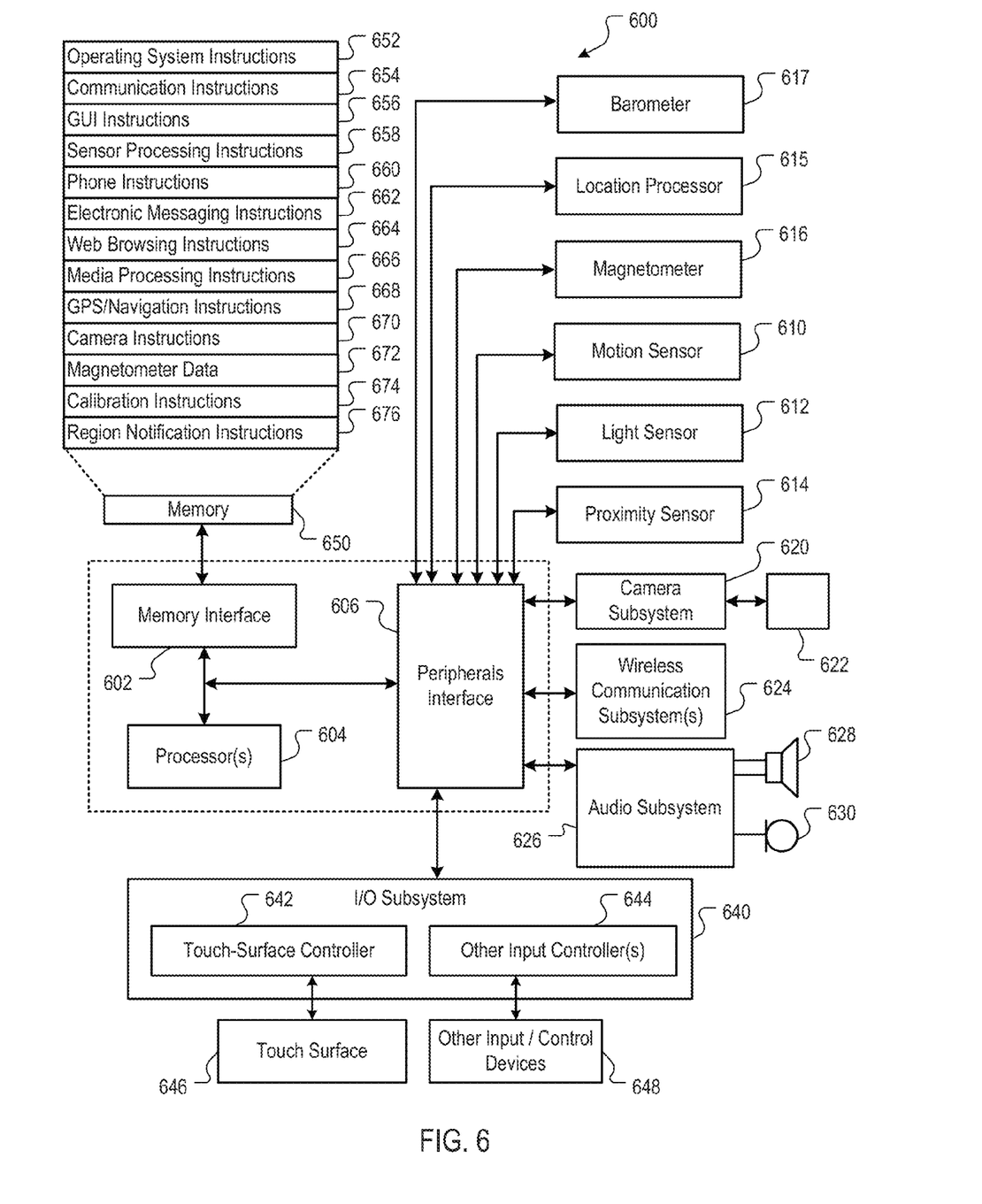
FIG. 6 is a block diagram illustrating exemplary device architecture of a mobile device implementing the features and operations of FIGS. 1-5.

FIG. 6 is a block diagram illustrating exemplary device architecture 600 of a mobile device implementing the features and operations of FIGS. 1-5. A mobile device (e.g., mobile device 102) can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include application processors, baseband processors, and wireless processors. The various components in mobile device 102, for example, can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network, and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to mobile device 102 on or off. The user may be able to customize a functionality of one or more of the buttons. The touch surface 646 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod®. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin, RTXC, LINUX, UNIX, OS X, WINDOWS, iOS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store region notification instructions 676 that, when executed, can cause processor 604 to perform operations of application subsystem 404 as described above in reference to FIG. 4. The operations can include procedure 500 as described above in FIG. 5.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Exemplary Operating Environment

Figure 7:
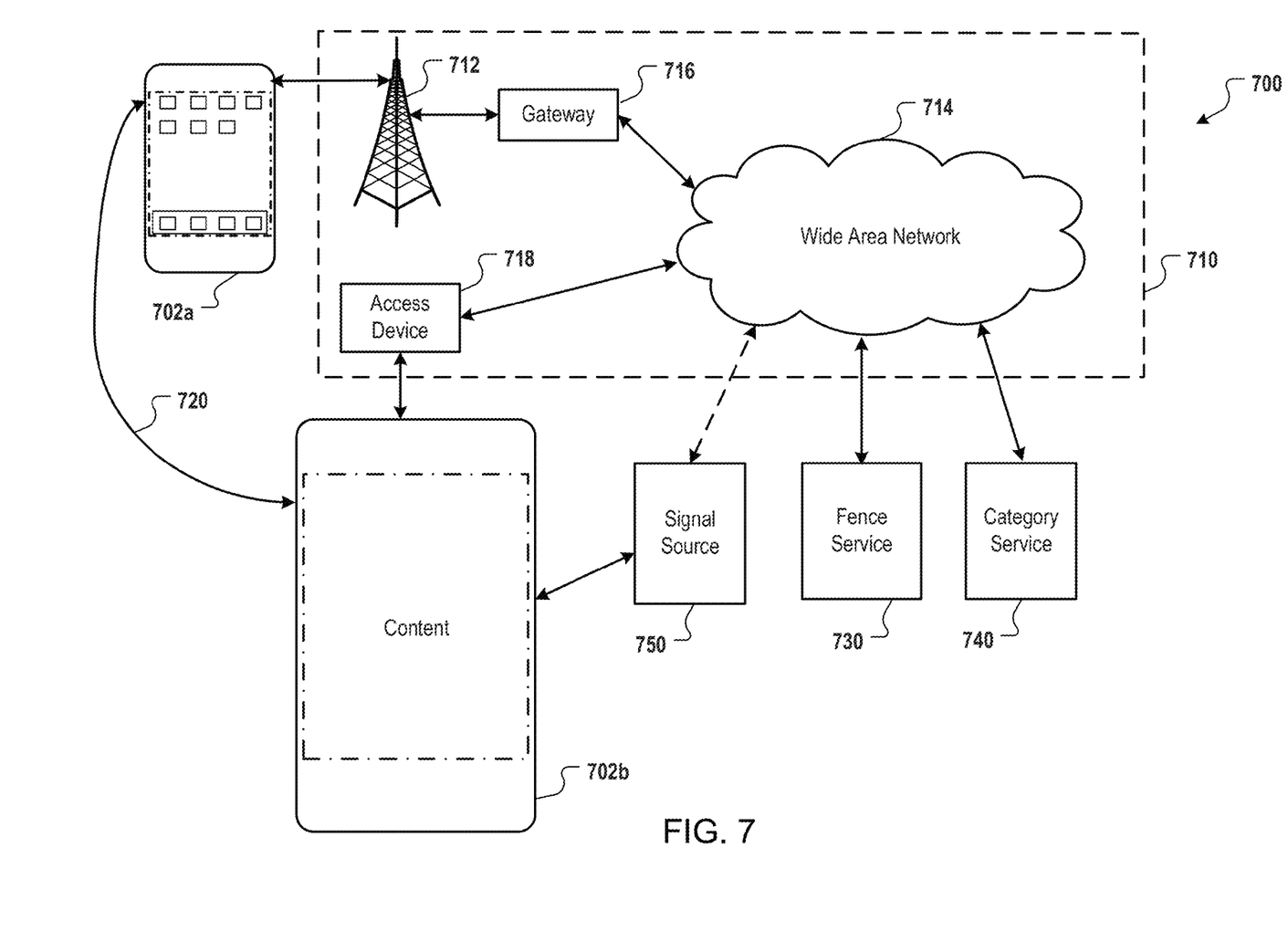
FIG. 7 is a block diagram of an exemplary network operating environment for the mobile devices implementing the features and operations of FIGS. 1-5.

FIG. 7 is a block diagram of exemplary network operating environment 700 for the mobile devices implementing the features and operations of FIGS. 1-5. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access point, can provide communication access to the wide area network 714. Each of mobile devices 702a and 702b can be mobile device 102.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless device 702a can communicate with other wireless devices, e.g., other mobile devices, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

Mobile device 702a or 702b can, for example, communicate with one or more services 730 and 740 over the one or more wired and/or wireless networks. For example, one or more proximity fence services 730 can provide proximity fence-triggered application programs and associated identifiers to mobile devices 702a and 702b. Category service 740 can provide published categories (e.g., businesses or organizations) and corresponding UUIDs to mobile devices 702a and 702b such that a user of mobile devices 702a and 702b can add a signal source for monitoring by adding a category. For example, mobile devices 702a and 702b can add a category "custom trucks" to add a group of signal sources related to vehicle customization businesses for monitoring.

Mobile device 702a or 702b can communicate with one or more signal sources 750. Each signal source 750 can be a wireless beacon configured to broadcast a signal source identifier. The signal source identifier can include a UUID. Each signal source 750 can communicate to other devices through wide area network 714 or facilitate communication between mobile device 702a or 702b with the other devices. In some implementations, each signal source 750 can be independent from a communications network, and function solely as beacons of proximity fences.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
   receiving, by a processor of a mobile device from a sensor of the mobile device and when the processor is in a power-saving operating mode, a signal indicating that the mobile device has entered or exited a virtual fence;
   transitioning, by the processor, from the power-saving operating mode to an active operating mode and staying in the active operating mode for a specified period of time before transitioning back to the power-saving operating mode, wherein during the active operating mode, the processor registers an event of the entry or exit of the virtual fence;
   detecting an input for activating the processor of the mobile device; and
   executing an application program based on the registered event, wherein execution of the application program is configured to be triggered by the event of entry or exit of the virtual fence, and wherein triggering the execution of the application program is delayed from the event of entry or exit to transitioning, in response to the input, from the bower-saving operating mode to the active operating mode.

2. The method of claim 1, wherein the virtual fence is a geofence associated with a location or a proximity fence associated with a group of one or more signal sources.

3. The method of claim 1, wherein:
   the sensor comprises a radio frequency (RF) receiver configured to detect an RF signal identifying a signal source registered at the RF receiver, the signal source being an access point of a wireless local area network (WLAN) or a signal source of a personal area network (PAN).

4. The method of claim 3, wherein the signal source of the PAN includes a Bluetooth™ Low Energy (BTLE) beacon.

5. The method of claim 1, wherein:
the signal includes a notification of the entry or exit; and
when the signal indicates the entry into the virtual fence, the sensor is configured to send additional notifications to the processor until the sensor detects the exit.

6. The method of claim 1, wherein registering the event comprises storing the event on a storage device until receiving a next signal or until execution of the application program.

7. The method of claim 1, wherein detecting the input comprises detecting an action on a home button of the mobile device or a user gesture on a display surface of the mobile device for unlocking the mobile device.

8. The method of claim 1, comprising activating a display surface of the mobile device in response to the input.

9. The method of claim 8, wherein executing the application program comprises providing information related to the virtual fence for display on the display surface based on the event in a user interface of the application program.

10. The method of claim 1, wherein executing the application program is performed by the mobile device or a server connected to the mobile device.

11. A mobile device comprising:
a processor;
a sensor; and
a non-transitory storage device storing instructions operable to cause the processor to perform operations comprising:
receiving, from the sensor of the mobile device and when the processor is in a power-saving operating mode, a signal indicating that the mobile device has entered or exited a virtual fence;
transitioning from the power-saving operating mode to an active operating mode and staying in the active operating mode for a specified period of time before transitioning back to the power-saving operating mode, wherein during the active operating mode, the processor registers an event of the entry or exit of the virtual fence;
detecting an input for activating the processor of the mobile device; and
executing an application program based on the registered event, wherein execution of the application program is configured to be triggered by the event of entry or exit of the virtual fence, and wherein triggering the execution of the application program is delayed from the event of entry or exit to transitioning, in response to the input, from the power-saving operating mode to the active operating mode.

12. The mobile device of claim 11, wherein the virtual fence is a geofence associated with a location or a proximity fence associated with a group of one or more signal sources.

13. The mobile device of claim 11, wherein:
the sensor comprises a radio frequency (RF) receiver configured to detect an RF signal identifying a signal source registered at the RF receiver, the signal source being an access point of a wireless local area network (WLAN) or a signal source of a personal area network (PAN).

14. The mobile device of claim 13, wherein the signal source of the PAN includes a Bluetooth™ Low Energy (BTLE) beacon.

15. The mobile device of claim 11, wherein:
the signal includes a notification of the entry or exit; and
when the signal indicates the entry into the virtual fence, the sensor is configured to send additional notifications to the processor until the sensor detects the exit.

16. The mobile device of claim 11, wherein registering the event comprises storing the event on a storage device until receiving a next signal or until execution of the application program.

17. The mobile device of claim 11, wherein detecting the input comprises detecting an action on a home button of the mobile device or a user gesture on a display surface of the mobile device for unlocking the mobile device.

18. The mobile device of claim 11, comprising activating a display surface of the mobile device in response to the input.

19. The mobile device of claim 18, wherein executing the application program comprises providing information related to the virtual fence for display on the display surface based on the event in a user interface of the application program.

20. The mobile device of claim 11, wherein executing the application program is performed by the mobile device or a server connected to the mobile device.

21. A non-transitory storage device coupled to a mobile device and storing instructions operable to cause a processor of the mobile device to perform operations comprising:
receiving, from a sensor of the mobile device and when the processor is in a power-saving operating mode, a signal indicating that the mobile device has entered or exited a virtual fence;
transitioning from the power-saving operating mode to an active operating mode and staying in the active operating mode for a specified period of time before transitioning back to the power-saving operating mode, wherein during the active operating mode, the processor registers an event of the entry or exit of the virtual fence;
detecting an input for activating the processor of the mobile device; and
executing an application program based on the registered event, wherein execution of the application program is configured to be triggered by the event of entry or exit of the virtual fence, and wherein triggering the execution of the application program is delayed from the event of entry or exit to transitioning, in response to the input, from the power-saving operating mode to the active operating mode.

22. The non-transitory storage device of claim 21, wherein the virtual fence is a geofence associated with a location or a proximity fence associated with a group of one or more signal sources.

23. The non-transitory storage device of claim 21, wherein:
the sensor comprises a radio frequency (RF) receiver configured to detect an RF signal identifying a signal source registered at the RF receiver, the signal source being an access point of a wireless local area network (WLAN) or a signal source of a personal area network (PAN).

24. The non-transitory storage device of claim 23, wherein the signal source of the PAN includes a Bluetooth™ Low Energy (BTLE) beacon.

25. The non-transitory storage device of claim 21, wherein:
the signal includes a notification of the entry or exit; and
when the signal indicates the entry into the virtual fence, the sensor is configured to send additional notifications to the processor until the sensor detects the exit.

26. The non-transitory storage device of claim 21, wherein registering the event comprises storing the event on a storage device until receiving a next signal or until execution of the application program.

27. The non-transitory storage device of claim 21, wherein detecting the input comprises detecting an action on a home button of the mobile device or a user gesture on a display surface of the mobile device for unlocking the mobile device.

28. The non-transitory storage device of claim 21, comprising activating a display surface of the mobile device in response to the input.

29. The non-transitory storage device of claim 28, wherein executing the application program comprises providing information related to the virtual fence for display on the display surface based on the event in a user interface of the application program.

30. The non-transitory storage device of claim 21, wherein executing the application program is performed by the mobile device or a server connected to the mobile device.

* * * * *

UNITED STATES PATENT AND TRADEMARK OFFICE
CERTIFICATE OF CORRECTION

PATENT NO.       : 9,307,358 B2  
APPLICATION NO.  : 13/913492  
DATED            : April 5, 2016  
INVENTOR(S)      : Lukas M. Marti et al.

Page 1 of 1

It is certified that error appears in the above-identified patent and that said Letters Patent is hereby corrected as shown below:

In the claims,

Column 12; Line 59: In Claim 1, delete "bower-saving" and insert -- power-saving --, therefor.

Signed and Sealed this  
Seventh Day of June, 2016

Michelle K. Lee  
*Director of the United States Patent and Trademark Office*